United States Patent
Melaibari

(10) Patent No.: US 9,150,458 B2
(45) Date of Patent: Oct. 6, 2015

(54) METHOD OF INCREASING THE HARDNESS OF WURTZITE CRYSTALLINE MATERIALS

(71) Applicant: KING ABDULAZIZ UNIVERSITY, Jeddah (SA)

(72) Inventor: Ammar A. Melaibari, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 339 days.

(21) Appl. No.: 13/752,338

(22) Filed: Jan. 28, 2013

(65) Prior Publication Data

US 2014/0210139 A1    Jul. 31, 2014

(51) Int. Cl.
 C04B 41/80    (2006.01)
 C04B 41/00    (2006.01)
 C04B 35/5831  (2006.01)

(52) U.S. Cl.
 CPC ......... *C04B 41/0036* (2013.01); *C04B 35/5831* (2013.01); *C04B 41/009* (2013.01); *C04B 41/80* (2013.01); *C04B 2235/386* (2013.01); *C04B 2235/5454* (2013.01); *C04B 2235/80* (2013.01); *C04B 2235/85* (2013.01)

(58) Field of Classification Search
 CPC .................. C04B 41/0036; C04B 35/5831
 See application file for complete search history.

(56) References Cited

U.S. PATENT DOCUMENTS

| | | | |
|---|---|---|---|
| 3,212,852 A | 10/1965 | Bundy | |
| 4,483,836 A | 11/1984 | Adadurov et al. | |
| 5,885,666 A | 3/1999 | Doll et al. | |
| 6,562,746 B2 | 5/2003 | Enya et al. | |
| 7,098,149 B2 | 8/2006 | Lukas et al. | |
| 2011/0230122 A1 | 9/2011 | Le Godec et al. | |
| 2012/0009402 A1 | 1/2012 | Johansson et al. | |

OTHER PUBLICATIONS

Melaibari et al. "Laser/waterjet heat treatment of polycrystalline cubic/wurtzite boron nitride composite for reaching hardness of polycrystalline diamond." Materials Letters, vol. 89 (Aug. 18, 2012), pp. 123-125.).*
Divakar, C., *Boron Nitride Based Cutting Tools*. Metals, Materials and Processes, vol. 12, No. 2 and 3, pp. 197-214, Jan. 10, 2000.
Dubrovinskaia, Natalia et al., *Superhard Nanocomposite of Dense Polymorphs of Boron Nitride: Noncarbon Material Has Reached Diamond Hardness*, abstract. Applied Physics letters 90, 101912 (2007), two pages.

(Continued)

*Primary Examiner* — Erin Snelting
(74) *Attorney, Agent, or Firm* — Richard C Litman

(57) ABSTRACT

The method of increasing the hardness of wurtzite crystalline materials is directed to the production of tool bits and inserts having a hardness approaching that of diamond, while simultaneously providing greater toughness and fracture resistance than diamond. The method includes forming a workpiece of boron nitride having a wurtzite crystal structure (wBN), and optionally combining boron nitride having a cubical crystal structure (cBN) with the wBN material. The workpiece is heat-treated by a defocused laser beam moved across the surface at a rate sufficient to preclude melting or deformation of the workpiece. The heated area is quickly quenched by a water jet, and a gas jet immediately follows the laser path to assure separation of the water from the laser contact area. The result is an increase in hardness of about 88%, from an initial hardness of about 40 GPa to a treated hardness of about 75 GPa.

20 Claims, 4 Drawing Sheets

(56) References Cited

OTHER PUBLICATIONS

Zhang, R. F. et al., *Anisotropic Ideal Strengths and Chemical Bonding of Wurtzite BN in Comparison to Zinc Blende BN*, abstract. Physical Review B, vol. 77, 172103 (2008), two pages.

Pan, Zicheng et al., *Harder Than Diamond: Superior Indentation Strength of Wurtzite BN and Lonsdaleite*, abstract. Physical Review Letters, vol. 102, 055503 (2009), two pages.

* cited by examiner

METHOD OF INCREASING THE HARDNESS OF WURTZITE CRYSTALLINE MATERIALS

BACKGROUND OF THE INVENTION

1. Field of the Invention

The present invention relates generally to materials treatment methods, and particularly to a method of increasing the hardness of wurtzite crystalline materials. The method significantly increases the hardness of such materials so that cutting tools and inserts formed from the hardened wurtzite crystalline material have significantly increased longevity in interrupted and ultra-precision cutting.

2. Description of the Related Art

Extremely hard materials have long been recognized as optimal for forming cutting tools, tool inserts, drill bits and inserts for such bits, and related components. Generally speaking, the harder the tool or insert, the greater its longevity before requiring sharpening or replacement. This is dependent upon many different factors, such as the material of which the workpiece is formed, the specific geometry of the cutting tool or insert, the cutting depth and angle relative to the workpiece, the cutting speed and lubricant (if any), and other factors.

Diamond has long been recognized as the essentially universal standard of hardness. Monocrystalline cubic structure diamonds have a hardness on the order of 100 GPa (gigaPascals), or about 14,500,000 psi (pounds per square inch) using the Vickers hardness test. While all diamond is formed of essentially pure carbon, the crystalline structure may differ. Another allotrope of diamond is known as lonsdaleite, which has a hexagonal crystal structure that approaches the hardness of cubic crystalline diamond in its natural form. However, a simulated pure sample of lonsdaleite has been found to have a hardness on the order of half again that of cubic crystalline diamond. Lonsdaleite is very rare, being formed only as a result of some meteor impacts and by synthesis.

While diamond material is considered to have the optimal hardness for use on the cutting edges of tool bits, cutting inserts, and the like, it does have its drawbacks, in that is not as chemically and thermally stable as many other materials that may be used for such purposes. While the use of diamond (both natural and synthetic) to form the cutting edges of various tool bits and cutting inserts is well known, there is nevertheless considerable interest in finding even harder materials and/or materials having greater chemical and thermal stability to provide greater economy and greater longevity for such tool bits and inserts.

Crystalline boron nitride (BN) is one such material. BN is not found in nature, but must be synthesized. However, crystalline BN can vary considerably in hardness, primarily depending upon the specific crystal matrix or structure of which the compound is formed. For example, BN having a cubic crystal structure (cBN) may have a hardness varying from 30 GPa to 43 GPa, depending upon the orientation of the applied test force relative to the crystal structure.

Another form of crystalline boron nitride may be formed from the shock compression of amorphous boron nitride, or treating hexagonal boron nitride (hBN) under extremely high static pressure and temperature. Such treatments produce boron nitride having a metastable crystal structure. This crystal structure is known as wurtzite boron nitride, or wBN, to differentiate it from cubic boron nitride, or cBN. Further shocks or treating with higher pressure and temperatures will transform wBN to cBN. The hardness of wBN has been determined in a range from 223 GPa to 52.5 GPa by the Vickers hardness test. Pure wBN, or wBN mixed with cBN in a polycrystalline matrix in a binder, results in an extremely hard material second only to diamond in hardness. The advantages of such wBN and/or cBN material in terms of thermal and chemical stability and resulting longevity make it attractive, even though its absolute hardness is less than diamond.

Thus, a method of increasing the hardness of wurtzite crystalline materials solving the aforementioned problems is desired.

SUMMARY OF THE INVENTION

The method of increasing the hardness of wurtzite crystalline materials, when applied to a dual-phase boron nitride (BN) material containing wurtzite crystalline structure fractions, results in the creation of an interlayer amorphous phase of boron nitride along the grain boundaries of the compound and significant reduction in the grain-size of the material, and induces residual stresses inside the material. This will greatly increase the hardness in comparison to untreated wBN and cBN compounds. The method includes initially forming an object workpiece comprising a mixture of cubic boron nitride (cBN) and wurtzite boron nitride (wBN), preferably having about a 50% mixture of each of the two crystal configurations. The mixture may contain a small amount of impurities. The workpiece is then cleaned using appropriate solvents, e.g., acetone and methanol, and secured to a suitable work surface.

The workpiece is then treated by heating its surface with a laser. The heating is controlled to avoid melting or otherwise deforming the surface of the workpiece. An exemplary laser tool that may be used with the process is a continuous wave $CO_2$ unit with power of about 200 watts and a defocused beam to avoid pinpoint overheating of the workpiece surface. The laser is moved across the surface at a velocity sufficient to avoid overheating the surface. Multiple passes are made over the workpiece in order to treat the entire surface of the workpiece, the passes preferably overlapping by about one-half the width of each pass.

The heated surface of the workpiece immediately behind the laser contact area is quickly quenched with a water jet as the laser advances. Separation of the water jet from the laser contact area is achieved by applying an air jet surrounding the laser contact area on the workpiece. This method of treating the workpiece resulted in a hardness increase of about 88%, from an initial hardness averaging about 40 GPa to a treated hardness of about 75 GPa using the Vickers hardness test.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The method of increasing the hardness of wurtzite crystalline materials serves to increase the hardness of such materials significantly, thereby improving their potential utility for use as tool bits, drill bits, cutting inserts, and similar articles for use in drilling, machining, and similar operations. The method of increasing the hardness of wurtzite crystalline materials has been found to produce such materials having a hardness approaching that of diamond. Cubic/wurtzite crystalline materials treated by the present method have increased hardness compared to conventional materials.

Figure 1:
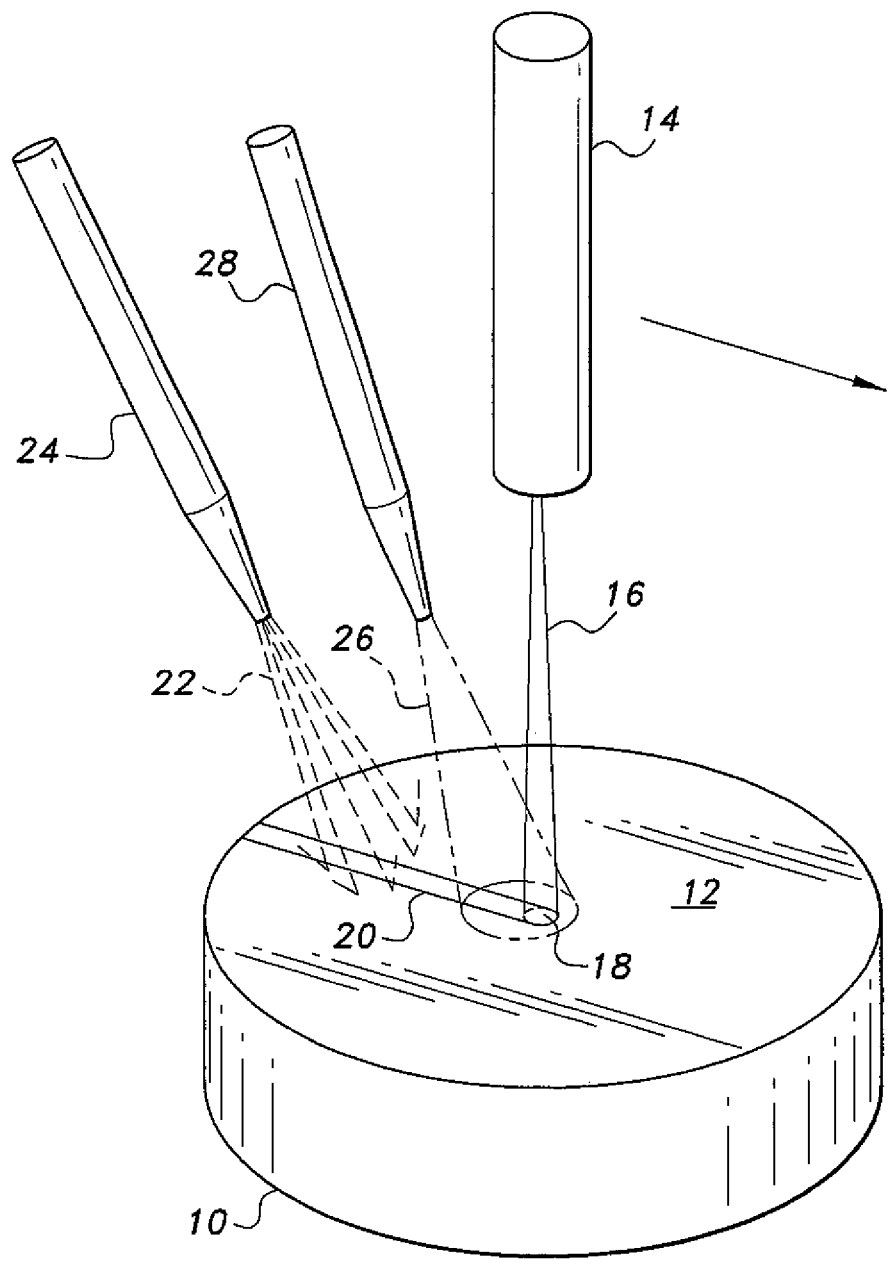
FIG. 1 is a diagrammatic perspective view of a workpiece being treated using the method of increasing the hardness of wurtzite crystalline materials according to the present invention.

FIG. 1 of the drawings provides a diagrammatic perspective view illustrating the basic procedure in the treatment of a workpiece 10 of wurtzite crystalline material, e.g., cubic/wurtzite boron nitride (cBN/wBN). In the present method, two different crystal configurations of boron nitride may be combined to form the workpiece 10 having cBN and wBN crystal structures in about a 50 percent mix of each (a molar ratio of 1:1). Such material results in an extremely hard material, even before heat treating, due to the random orientation of the resulting polycrystalline structure. Other materials having a wurtzite crystalline structure may be used in lieu of the BN material described above. For example, the workpiece 10 may include zinc oxide (ZnO), silver iodide (AgI), cadmium sulfide (CdS), cadmium selenide (CdSe), silicon carbide (SiC), aluminum nitride (AlN), gallium nitride (GaN), and diamond having a wurtzite crystalline structure, i.e., lonsdaleite. Other wurtzite crystalline materials in addition to those specifically listed above may also be used.

The treatment procedure involves heating the surface 12 of the workpiece 10 using a suitable laser 14 and moving the laser over the surface of the workpiece, or alternatively moving the workpiece relative to the laser. The laser 14 may be one of a number of suitable lasers. An exemplary laser that may be used is a continuous wave $CO_2$ laser of about 200 Watt capacity. Lasers in general are known to produce an extremely narrow, coherent beam of energy that can result in extreme heating and melting of the surface upon which they are directed, depending upon the specific characteristics of a given laser. Accordingly, the laser 14 used in the present treatment method is defocused, as evidenced by the spreading of the laser beam 16 shown in FIG. 1. The spread of the beam 16 and the distance of the laser 14 from the surface 12 of the workpiece 10 are selected to produce a laser-heated contact area 18 of about one millimeter in diameter on the surface 12 of the workpiece 10. It will be seen that the area of the laser contact area 18 is exaggerated in FIG. 1. The amount of heat delivered to the surface 12 of the workpiece 10 is controlled to avoid melting or deformation of the surface.

In FIG. 1, it will be seen that the laser 14 and its beam 16 are oriented normal to the plane of the surface 12 of the workpiece 10. This results in the greatest concentration of laser energy upon the smallest area of the workpiece surface 12. However, the laser 14 may be adjusted such that the beam 16 is at some acute angle relative to the workpiece surface 12. It will be seen that tilting the laser 14 so that its beam 16 is at some acute angle of less than 90° to the workpiece surface 12 will result in the spreading of the laser energy over a larger area on the workpiece surface, thereby reducing the heat imparted to any given point on the surface. The heat energy delivered to a given area of the surface 12 of the workpiece 10 may thus be adjusted by tilting the laser 14 relative to the workpiece surface 12 to increase the laser-heated contact area 18. However, in the example of FIG. 1 the axis of the laser 14 is oriented to project its beam 16 normal to the workpiece surface 12 for optimum heating of the laser heated contact area 18 by the defocused beam.

The amount of heat delivered to the laser-heated contact area 18 on the workpiece 10 may also be controlled by the velocity of the moving laser 14 over the workpiece. For example, the laser 14 may be moved over the workpiece surface 12 at a velocity of 68 millimeters per second, or about 2⅔ inches per second. The same effect may be achieved by moving the workpiece 12 relative to a stationary laser 14, e.g., securing the workpiece 12 in the indexing table of a milling machine or the like and moving the workpiece by operating the table. It will be seen that higher velocities will reduce the amount of heat delivered to a given area of the workpiece surface 12, while lower velocities will increase the heat delivered. Defocusing the laser beam 16, adjusting the distance between the laser 14 and the surface 12 of the workpiece 10, adjusting the power of the laser 14, adjusting the angle of the laser 14 and its beam 16 relative to the plane of the surface 12 of the workpiece 10, and adjusting the velocity of the laser 14 over the surface 12 of the workpiece 10 are various techniques that may be used to adjust the amount of heat delivered to the laser-heated contact area 18 to avoid melting, cutting, or deformation.

It has been found that rapidly lowering the temperature of the laser-heated contact area 18 immediately following passage of the laser 14 results in superior hardening of the workpiece 10. Accordingly, the laser beam path 20 is quenched with a liquid jet 22 (e.g., water, machining coolant, oil, etc.) to remove the heat rapidly from the laser beam path 20 immediately adjacent to the laser-heated contact area 18. The liquid jet 22 is aligned at an angle between the laser 14 and its beam 16 and the plane of the surface 12 of the workpiece 10 in order to aim the liquid jet 22 more closely toward the laser-heated contact area 18, while still separating the laser 14 and liquid jet nozzle 24.

The quenching water jet (or other liquid) 22 is precluded from contacting the laser-heated contact area 18 in order to avoid reducing the desired heating of that area. This is accomplished by providing a jet of air 26 (or other gas, e.g., nitrogen, argon, etc.) adjusted to surround or closely follow the laser-heated contact area 18. The air or gas delivery nozzle 28 is disposed between the laser 14 and the nozzle 24 for delivery of water or other liquid quenching fluid. The velocity and volume of the gas jet 26 is adjusted to blow away any liquid spray that might otherwise splash into the laser-heated contact area 18. Thus, the liquid only contacts the laser beam path 20 immediately behind the moving laser-heated contact area 18 as the laser 14 moves over the surface 12 of the workpiece 10.

Figure 2:
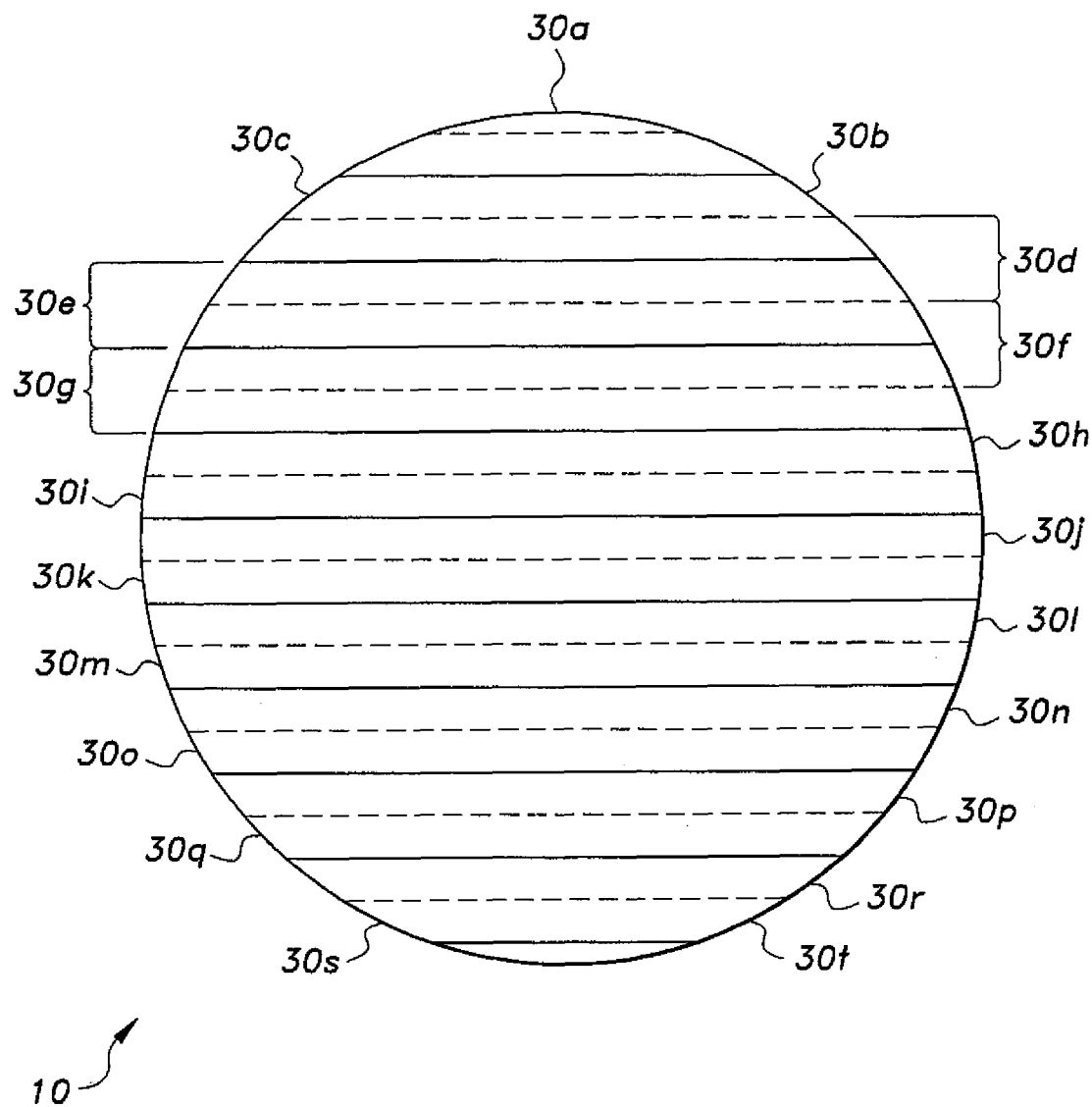
FIG. 2 is a diagrammatic top plan view of a workpiece, illustrating the preferred overlapping treatment passes across the workpiece using the method of increasing the hardness of wurtzite crystalline materials according to the present invention.

FIG. 2 of the drawings is a top plan view of an exemplary workpiece 10, illustrating the preferred path or paths traveled over the surface of the workpiece by the moving laser. The diameter of the laser heated contact area (FIG. 1) is on the order of one millimeter, as noted further above. Accordingly, a typical workpiece 10 will require multiple passes by the laser and its laser beam in order to heat the entire surface. Rather than spacing these passes from one another a distance equal to the diameter of the laser heated contact area, e.g., one millimeter, it is preferred that there be some overlap to assure that the entire surface has been heated. It has been found that a fifty percent overlap works well to assure that the entire surface is heated. FIG. 2 illustrates a series of passes 30a through 30t by the laser beam across the surface of the workpiece 10. Each pass is made in a straight line, and the passes are all parallel to one another. The lower edge of the first pass 30a is represented by a solid line, and the lower line of the next pass 30b is shown by a broken line. Subsequent alternating overlapping passes are shown similarly. The lower edges of the third pass 30c, fifth pass 30e, seventh pass 30g, etc., are shown by solid lines, and the lower edges of the intervening fourth pass 30d, sixth pass 30f, eighth pass 30h, etc., are shown by broken lines in FIG. 2. The ends of the fourth through seventh passes 30d through 30g are designated by brackets in FIG. 2 for further clarity. The overlap may be adjusted to provide greater or lesser overlap area. Also, while all of the paths are shown parallel to one another in the example of FIG. 2, it will be seen that the paths may be adjusted to travel paths in other than straight lines, and the overlapping passes may be other than parallel with one another, so long as the entire surface of the workpiece is heated to the desired degree by the laser.

EXAMPLE

The present method was tested on a polycrystalline sample containing 50% cBN 50% wBN (mole:mole) and iron oxide impurity. Cylindrical samples having a nominal diameter of 9.5 mm and a height of 3 mm were used. The composite material contained many structural defects in the form of dislocations, stacking faults, and point defects. The surfaces of the samples were cleaned with acetone and methanol before being mounted on an X-Y positioning stage. The heat treatment was performed using a defocused beam of 1 mm spot at a laser power of 200 W and a speed of 68 mm/s. Multiple overlapping passes with an overlap of 50% were carried out to cover the 9.5 mm diameter surface. Optical and scanning electron microscopy revealed clean surfaces with no evidence of cracks, suggesting that the heat treatment stresses did not exceed the fracture strength. There was formation of nano-sized grains. X-ray spectroscopy and Raman spectroscopy showed that the stoichiometric ration of B to N remained unchanged after heat treatment, suggesting the absence of oxidation. Carbon concentration increased, probably from absorption of adhesive used to mount the samples. In Raman spectroscopy, the ratio of peaks corresponding to 1052 $cm^{-1}$ (cBN) and 1040 $cm^{-1}$ (wBN) became larger, suggesting the partial transformation of wBN to cBN.

Indentation hardness tests were conducted using a Tukon micro-hardness tester with a Vicker's diamond pyramid indenter. The load was 1 kgf (9.81 N), and test duration was 30 s. Measurements were made using a high resolution (±1 μm) optical microscope to ensure that no fracture had occurred and to measure the length of the diagonals of the indentations. Vicker's hardness was then calculated using the relationship HV=1÷0.854 L/$d^2$, where L is the normal load (N) and d is the average length of the two diagonals (m) of the Vicker's indentation.

Figure 3:
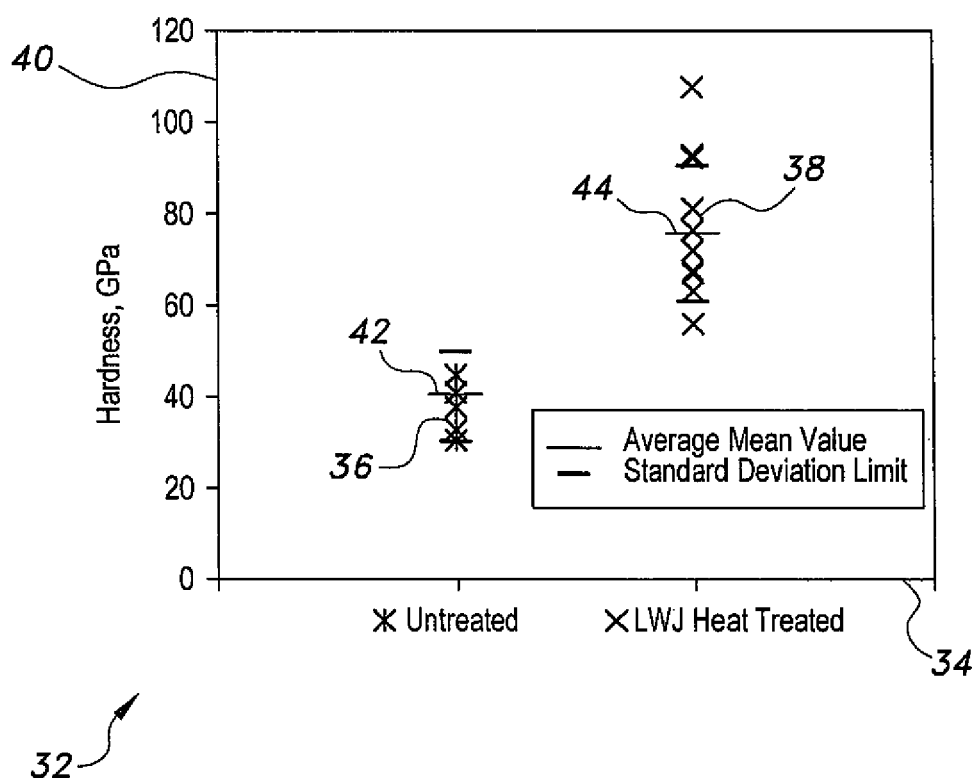
FIG. 3 is a graph comparing the hardness of an untreated workpiece with a workpiece treated by the method of increasing the hardness of wurtzite crystalline materials according to the present invention.

FIG. 3 of the drawings is a chart or graph 32 illustrating the increase in hardness achieved by the present method. There are no values assigned to the X-axis or horizontal axis 34 of the graph 32, since it merely separates the untreated sample test results 36 horizontally from the LWJ (laser water jet) heat-treated sample test results 38. The Y or vertical axis 40 of the graph 32 is a scale representing the hardness of the materials tested, ranging from zero to 120 (one hundred twenty) GPa (gigaPascals). It will be seen that the mean hardness value 42 for the untreated sample test results is about 40 (forty) GPa, or nearly 6,000,000 (six million) psi (pounds per square inch), using the Vickers hardness test. However, the samples 44 treated in accordance with the laser heat treatment and quenching described further above have a mean hardness value of about 75 (seventy-five) GPa, or slightly greater than 10,000,000 (ten million) psi. Thus, treating the cubic/wurtzite crystalline materials in accordance with the present method results in an increase in hardness of nearly 88 (eighty-eight) percent.

The formation of amorphous boron and the partial transformation of wBN (to cBN) are both temperature- and stress-dependent. Surface temperature is computed using a thermal model based on heat conduction as follows:

$$T(0, t) = \frac{(1-R)l_0}{k\delta}\left[2\frac{\sqrt{\alpha\delta^2 t}}{\pi} + \exp(\alpha\delta^2 t)\, \text{erf}\, c(\delta\sqrt{\alpha t}) - 1\right] + T_0,$$

where R is the reflection energy losses; $l_0$ is the incident laser power intensity; k is the thermal conductivity; δ is the absorption depth; t is the laser beam interaction time; α is the thermal diffusivity; and $T_0$ is the ambient temperature. The absorption depth of cBN is estimated from the complex refractive indices to be on the order of $10^{-5}$ m. Thermal properties were obtained from references, and are listed in Table 1, along with parameters of the laser water jet and the results of energy calculations in the last three rows of the table.

TABLE 1

LWJ parameters, thermal properties of samples, and thermal and stress analysis results

| Parameter | cBN/wBN |
| --- | --- |
| Laser power, (P) | 200 W |
| Spot size, (d) | $10^{-3}$ m |
| Power density ($I_0$) | 2.55 ($10^8$) W/$m^2$ |
| Beam interaction time | 0.015 s |
| Waterjet pressure | 0.4 MPa |
| Absorption depth, (δ) | $10^{-5}$ m |
| Reflection losses, (R) | 20% |
| Thermal conductivity, (k) | 40-50 W/mK[d] |
| Density, (ρ) | 3440 kg/$m^3$[d] |
| Specific heat, ($C_p$) | 800 J/kgK[d] |
| Thermal Diffusivity, (α = k/ρ$C_p$) | 1.64 ($10^{-5}$) $m^2$/$s^d$ |
| Linear thermal expansion, (λ) | 3.6 ($10^{-6}$)/K[d] |
| Young's modulus, (E) | 890 GPa[d] |
| Ambient temperature, ($T_0$) | 300K |
| Surface temperature[a] | 1660K |
| Thermal diffusion distance[b], (x) | 0.992 mm |
| Thermal stress at the surface[c], ($\sigma_T$) | 3.48 GPa |

Figure 4:
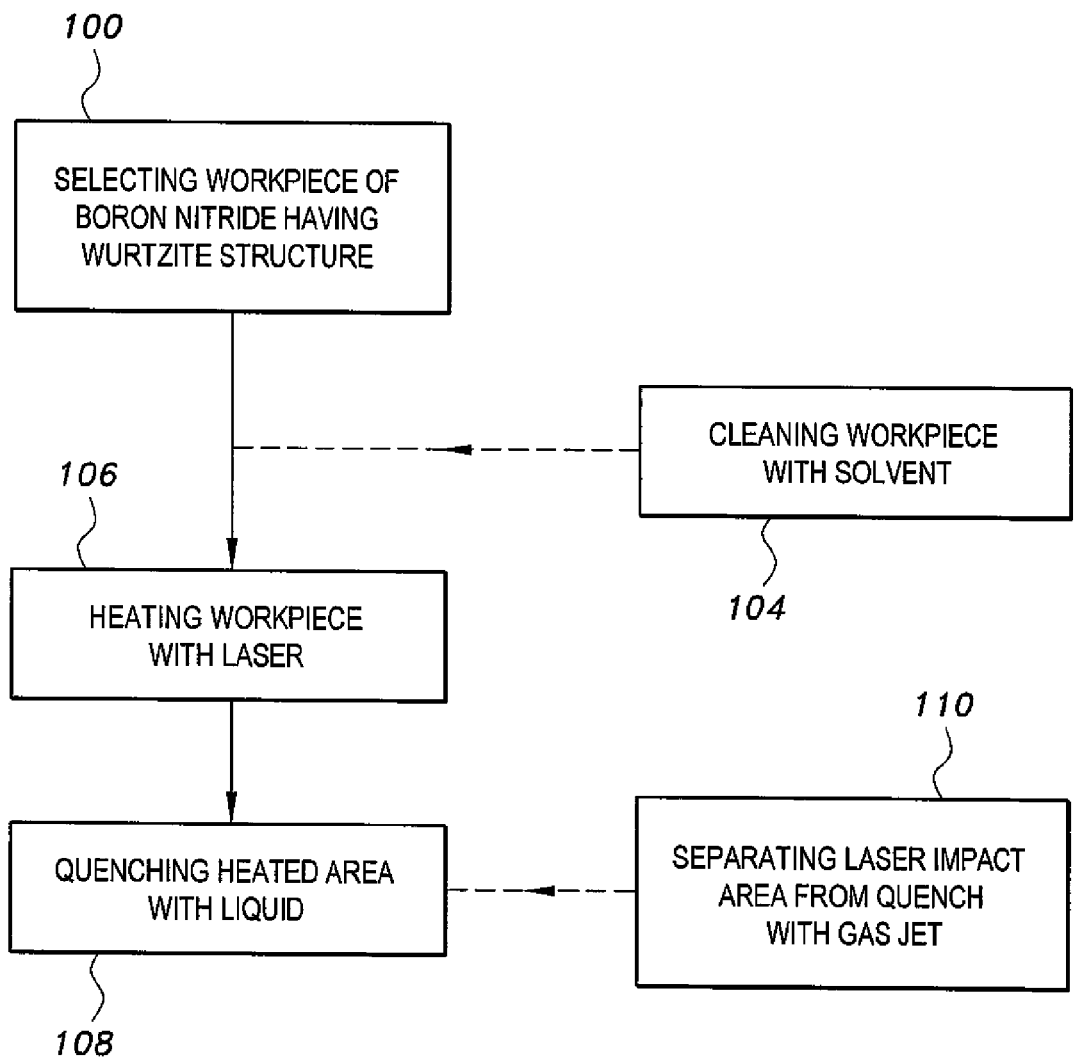
FIG. 4 is a flowchart illustrating the basic steps in the method of increasing the hardness of wurtzite crystalline materials according to the present invention.

[a]See above equation
[b]Thermal diffusion distance, x = (4αc)ϵ
[c]Thermal stress, $\alpha_r$ = λΔTϵ
[d]Literature value FIG. 4 of the drawings is a flowchart briefly describing the steps involved in the method of increasing the hardness of wurtzite crystalline materials. The initial step 100 briefly describes the initial selection or securing of the workpiece comprising materials having a wurtzite crystalline structure. The compound is preferably boron nitride (BN), although other compounds may be used as described further above. Optionally, the compound having a wurtzite crystalline structure may be mixed with a compound formed of the same chemical elements but having a cubic crystalline structure, thereby forming a composite material.

It is preferred that the surface of the workpiece be cleaned prior to applying the laser heat to the workpiece surface, as indicated by the optional second step 104 of the flowchart of FIG. 4. This is to assure more even heat treatment of the workpiece surface by removing any contaminants that might otherwise affect the penetration of the laser energy to the material of the workpiece. The cleaning is accomplished by the application of appropriate solvents, e.g., acetone, methanol, methyl-ethyl ketone (MEK), etc. One or more of these solvents, or other suitable solvents, may be used.

After the above has been accomplished, the surface of the workpiece is heated using the laser, as described further above and indicated generally in the third step 106 of FIG. 4. Multiple passes are made. The number of passes depends upon the width of the laser-heated contact area, the width of the workpiece, and the amount of overlap between adjacent laser passes. Rather than moving the laser, the workpiece may be moved relative to a stationary laser, as described further above. The effect is the same.

It is important that the laser-heated contact area be cooled immediately following the passage of the laser beam thereover, pass by pass. Accordingly, the path of the laser beam immediately behind the moving contact area is quenched with water or other appropriate liquid, as indicated by the fourth step 108 of the flowchart of FIG. 4 and described further above. The liquid must be prevented from splashing into the laser-heated contact area during the heating operation in order to assure that the heated area reaches the desired temperature. A jet of air or other suitable gas (nitrogen, etc.) is blown to surround or closely follow the laser-heated contact area to prevent liquid from entering this area during the heating operation, as shown in FIG. 1 and described further above and briefly described in the optional fifth step 110 of FIG. 4.

The result of the above-described heat treatment is a significant increase in the hardness of the wurtzite crystalline compound, as noted further above and shown in the graph of FIG. 3. The resulting heat-treated wurtzite crystalline compound, be it boron nitride or other suitable compound, provides a correspondingly significant increase in tooling life when the hardened material is fabricated as a tool bit or insert for machining, drilling, or other operations where such extremely hard materials are desired.

It is to be understood that the present invention is not limited to the embodiments described above, but encompasses any and all embodiments within the scope of the following claims.

I claim:

1. A method of increasing the hardness of wurtzite crystalline materials, comprising the steps of:
   (a) selecting a workpiece from a material at least partially composed of a wurtzite crystalline structure;
   (b) heating the workpiece with a moving laser applied to a surface of the workpiece, the laser defining a laser-heated contact area on the workpiece; and
   (c) quenching the laser-heated contact area with a water jet in tandem with the moving laser and immediately following the laser.

2. The method of increasing the hardness of wurtzite crystalline materials according to claim 1, further comprising a step of applying a jet of gas about the laser-heated contact area on the workpiece, thereby separating the laser-heated contact area from the water jet.

3. The method of increasing the hardness of wurtzite crystalline materials according to claim 1, wherein the step of heating the workpiece further comprises making multiple straight overlapping passes with the laser.

4. The method of increasing the hardness of wurtzite crystalline materials according to claim 1, wherein the step of selecting the workpiece includes selecting a composite boron nitride workpiece comprising a mixture of boron nitride having a wurtzite crystalline structure and boron nitride having a cubic crystalline structure.

5. The method of increasing the hardness of wurtzite crystalline materials according to claim 1, further comprising a step of cleaning the surface of the workpiece with at least one solvent prior to heating the surface of the workpiece with the moving laser.

6. The method of increasing the hardness of wurtzite crystalline materials according to claim 1, further comprising a step of defocusing the laser to heat an area of about one millimeter in diameter on the surface of the workpiece.

7. The method of increasing the hardness of wurtzite crystalline materials according to claim 1, further comprising steps of:
   (a) aligning the laser substantially normal to the surface of the workpiece; and
   (b) aligning the water jet at an angle between the laser and the surface of the workpiece.

8. A method of increasing the hardness of wurtzite crystalline materials, comprising the steps of:
   (a) selecting a workpiece from a material at least partially composed of a wurtzite crystalline structure;
   (b) heating the workpiece with a moving laser applied to a surface of the workpiece, the laser defining a laser-heated contact area on the workpiece;
   (c) applying a jet of gas about the laser-heated contact area on the workpiece; and
   (d) quenching the laser-heated contact area with a jet of liquid in tandem with the moving laser and immediately following the laser and the gas jet.

9. The method of increasing the hardness of wurtzite crystalline materials according to claim 8, wherein the step of quenching the laser-heated contact area with a jet of liquid comprises quenching the laser-heated contact area with water.

10. The method of increasing the hardness of wurtzite crystalline materials according to claim 8, wherein the step of heating the workpiece with a moving laser comprises making multiple straight overlapping passes with the laser.

11. The method of increasing the hardness of wurtzite crystalline materials according to claim 8, wherein the step of selecting the workpiece includes selecting a composite boron nitride workpiece comprising a mixture of boron nitride having a wurtzite crystalline structure and boron nitride having a cubic crystalline structure.

12. The method of increasing the hardness of wurtzite crystalline materials according to claim 8, further comprising a step of cleaning the surface of the workpiece with at least one solvent prior to heating the workpiece with the moving laser.

13. The method of increasing the hardness of wurtzite crystalline materials according to claim 8, further comprising a step of defocusing the laser to heat an area of about one millimeter in diameter on the surface of the workpiece.

14. The method of increasing the hardness of wurtzite crystalline materials according to claim 8, further comprising steps of:
   (a) aligning the laser substantially normal to the surface of the workpiece; and
   (b) aligning the liquid jet at an angle between the laser and the surface of the workpiece.

15. A method of increasing the hardness of wurtzite crystalline materials, comprising the steps of:
   (a) selecting a workpiece from a material at least partially composed of a wurtzite crystalline structure;
   (b) moving a laser beam across a surface of the workpiece in multiple straight overlapping passes, the laser defining a laser-heated contact area on the workpiece; and
   (c) quenching the laser-heated contact area with a jet of liquid in tandem with the moving laser and immediately following the laser.

16. The method of increasing the hardness of wurtzite crystalline materials according to claim 15, wherein the step of quenching the laser-heated contact area with a jet of liquid comprises quenching the laser-heated contact area with water.

17. The method of increasing the hardness of wurtzite crystalline materials according to claim 15, further comprising a step of applying a jet of gas about the laser-heated contact area on the workpiece, thereby separating the laser-heated contact area from the liquid jet.

18. The method of increasing the hardness of wurtzite crystalline materials according to claim 15, wherein the step of selecting the workpiece includes selecting a composite boron nitride workpiece comprising a mixture of boron nitride having a wurtzite crystalline structure and boron nitride having a cubic crystalline structure.

19. The method of increasing the hardness of wurtzite crystalline materials according to claim 15, further comprising a step of cleaning the surface of the workpiece with at least one solvent prior to moving the laser beam across the surface of the workpiece.

20. The method of increasing the hardness of wurtzite crystalline materials according to claim 15, further comprising steps of:
(a) defocusing the laser to heat an area of about one millimeter in diameter on the surface of the workpiece;
(b) aligning the laser substantially normal to the surface of the workpiece; and
(c) aligning the liquid jet at an angle between the laser and the surface of the workpiece.

\* \* \* \* \*